June 2, 1931.  S. BRAND  1,808,398
CASH REGISTER
Filed May 22, 1929  3 Sheets-Sheet 1

Inventor
Samuel Brand
By Carl Beust
Ralph E. Warfield
His Attorneys

June 2, 1931.　　　S. BRAND　　　1,808,398
CASH REGISTER
Filed May 22, 1929　　　3 Sheets-Sheet 2

Inventor
Samuel Brand
By
His Attorneys

June 2, 1931.  S. BRAND  1,808,398

CASH REGISTER

Filed May 22, 1929  3 Sheets-Sheet 3

Inventor
Samuel Brand
By
His Attorneys

Patented June 2, 1931

1,808,398

UNITED STATES PATENT OFFICE

SAMUEL BRAND, OF DAYTON, OHIO, ASSIGNOR TO THE NATIONAL CASH REGISTER COMPANY, OF DAYTON, OHIO, A CORPORATION OF MARYLAND

CASH REGISTER

Application filed May 22, 1929. Serial No. 365,176.

This invention relates to improvements in registers and like machines, and is more particularly directed to improvements in key locking mechanisms for such machines.

The invention is an improvement on the mechanisms disclosed in applications for Letters Patent of the United States, Serial No. 687,305, filed January 19, 1924, by Bernis M. Shipley, and Serial No. 335,337, filed January 26, 1929, by Samuel Brand, and is shown applied to the invention disclosed in the Brand application.

The Shipley machine, disclosed in the above-mentioned application, registers transactions, including registrations of sales comprising a single item, and sales wherein a plurality of items are registered and totals thereof taken, the former transactions being known as single-item transactions, and the latter as multiple-item transactions. When entering either of the above-named transactions, it is necessary to depress a clerk's or operator's identification key, and a transaction key. The particular clerk's key depressed is automatically released and restored to its normal undepressed position at or near the end of each single-item entering transaction, but in entering a multiple-item transaction, it is desirable that the clerk's key be held depressed during the entry of the successive items composing such a transaction, and automatically released only near the end of each totalizing operation, which constitutes a necessary concomitant of each multiple-item transaction.

In the above named Shipley and Brand applications, the printing hammers are so arranged that the clerk's initial is not printed beside the items of multiple-item transactions. However, in the use of the machine it has been found desirable to print the character designating each item, as it is entered, and to obtain such results, in machines where the present invention is used, the item printing hammers of said applications have been extended to include the transaction and clerk's type wheels.

It was also found advisable to provide a totalizer for each clerk. Such totalizers are not shown in the applications referred to, but the provision of clerks' totalizers is well known in the art.

The clerk's keys are known as "flexible" keys, that is, they are so arranged that depression of one clerk's key releases any previously depressed clerk's key. With this flexible key arrangement, in connection with the extended hammers to print from the clerk's type wheel it is possible, after entering any one item of a multiple-item transaction, and before the next succeeding item-entering operation is started, to depress another clerk's key, thereby releasing the clerk's key previously depressed. This would cause the record to indicate that the items of a multiple-item transaction were entered by two or more clerks, by printing two or more different clerks' identification symbols on the multiple-item receipt issued by the machine; and where the clerk's keys control individual totalizers, the total amount of a multiple-item transaction would be split between the two totalizers, so that neither would register the exact volume of business transacted by the corresponding clerk.

The Shipley application discloses a means to maintain any of the multiple-item keys in depressed position during the entry of the items comprising a multiple-transaction, and until the total of such items is taken, and one object of the present invention, is to provide a machine of the type indicated, so arranged that a clerk cannot mismanipulate the clerk's keys in the manner above explained, to falsify the record. To this end, means is provided to prevent depression of another of the clerk's keys or the release of the depressed clerk's key during the entry of multiple-item transactions.

Another object is to provide novel means to disable the key-retaining device, which holds the keys depressed, on certain operations of the machine.

An auxiliary object is to maintain in idle position the latching member which controls the locking of any of the clerk's keys in depressed position, until the usual key release mechanism has restored to its normal position, and in effecting this result, resort is had to a new arrangement of existing mechanism.

With these and incidental objects in view, the invention consists of certain novel features of construction and combinations of parts, the essential elements of which are set forth in appended claims and a preferred form or embodiment of which is hereinafter described with reference to the drawings which accompany and form a part of this specification.

In the drawings,—Fig. 1 is a view in right elevation of the bank of transaction keys and the differential mechanism controlled thereby.

*General description.*—The machine disclosed in Shipley's application, Serial No. 687,305, is provided with a plurality of banks of amount keys to control the machine to enter amount into the appropriate totalizer selected under control of a bank of transaction or control keys located generally at the right side of the keyboard. The amounts entered into the machine are printed by the printing mechanism provided for that purpose, and indicators display the amounts entered in the machine.

The bank of clerks' identification keys is located at the left side of the main keyboard and is slightly removed therefrom, means being provided which renders it necessary to depress one of these clerks' keys before the machine may be operated.

The keys in the transaction or control bank are arranged in two groups, known respectively, as the "single-item" keys and the "multiple-item" keys. The "single-item" keys control the machine for the entry of single-item transactions, and the "multiple-item" keys control the machine to enable the entry of a series of items forming a single transaction, and to compel the operator to take the total thereof, thereby completing a multiple-item transaction.

A total control lever is also provided in the machine disclosed in Shipley's application to condition the machine for taking totals and sub-totals from the totalizer or totalizers with which the machine is provided. This total control lever also controls certain parts which affect the operation of the present invention, as will be set forth later.

The components of the machine are mounted generally on a main frame work comprising a right side frame 25 (Fig. 7) and a left side frame 26 (Fig. 1), arranged in parallel and upright relation on a horizontal base 27.

Figure 6:
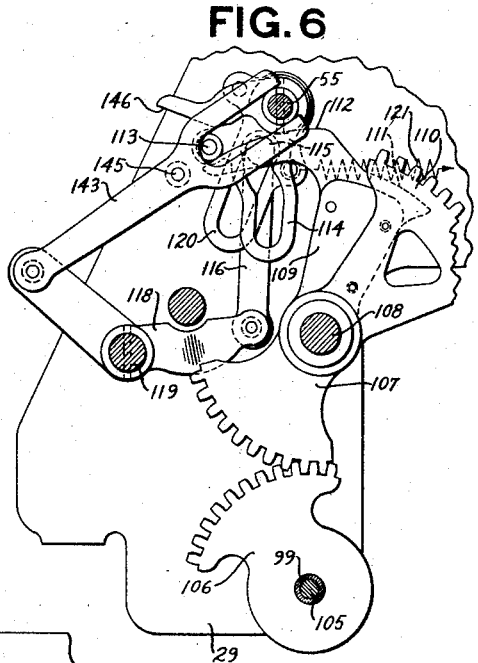
Fig. 6 is a detail view in right elevation of a part of the control mechanism adjusted by the total control lever and by the transaction bank differential mechanism.

*Clerk's keys.*—The clerk's keys 30 (Fig. 2) are slidably mounted in a frame 31, supported at its upper end on a cross rod 32, and at its lower end on a stud 33 extending between the left side frame 26 and a printer frame 29 (Fig. 6).

Each of the clerk's keys 30 carries a laterally projecting pin 34 (Fig. 2) which, upon depression of its key, wipes along the beveled edge of a shouldered projection 35 on a detent bar 36, slidable on headed studs 37 and 38 in the key frame 31. There are as many projections 35 on the detent bar 36 as there are keys 30, and the pin 34, as it wipes past its associated projection, slides the detent bar 36 toward the right against the tension of its restoring spring 39. When the key pin 34 has passed the shoulder on the projection 35, the spring 39 returns the detent bar 36 towards the left to hook the shoulder of its projection 35 over the key pin 34 of the depressed key, and thus retain the key in its depressed position until another key has been depressed, or until the detent bar 36 is shifted towards the right during the operation of the machine, to release the depressed key, as will be described later. Individual springs, not shown, return the depressed keys, as soon as released, to their normal undepressed positions.

Figure 4:
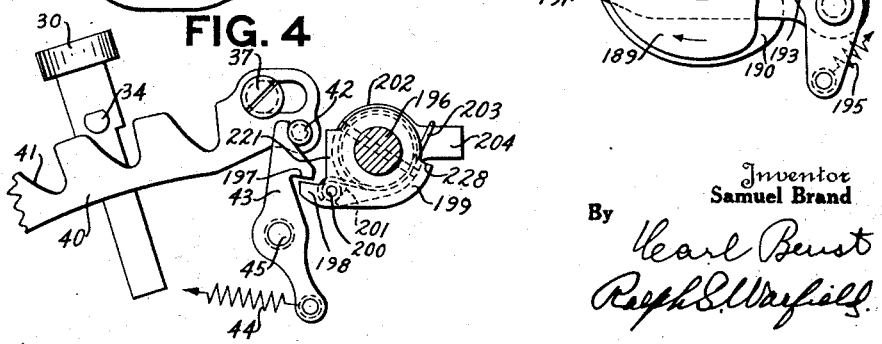
Fig. 4 is a fragmentary view of the mechanism to compel depression of a clerk's key before the machine may be operated.

The upper edge of a control bar 40 (Fig. 4), slidably mounted alongside the detent bar 36 on the headed studs 37 and 38, is formed with inclined or cammed surfaces 41 in the paths of the respective key pins 34 of the clerk's keys 30. Any of the keys 30, when depressed, causes its pin 34 to contact the corresponding inclined surface 41 on the control bar 40, to force the control bar towards the left, in which adjusted position it is held by the key pin 34 until the depressed key is released from its detent bar 36 and restored to its normal undepressed position.

At its upper end, the control bar 40 carries a stud 42, which, as the control bar 40 shifts towards the left, contacts with and rocks counter-clockwise a dog 43 pivoted at 45 on the key frame 31. The dog 43 rocks counter-clockwise against the tension of a spring 44 attached to the tail of the dog. When the depressed key 30 is released and restored to its undepressed position, the spring 44 rocks the dog 43 clockwise, restoring the control bar 40 to its normal position.

*Transaction keys.*—The transaction keys, comprising a group of multiple-item keys 63 and a group of single-item keys 64 (Fig. 1), are slidably mounted in a key frame 65, the upper end of which is supported on the cross rod 32 and its lower end supported on a cross rod 66 extending between the machine side frames 25 and 26.

Each of the multiple-item transaction keys 63 and the single-item transaction keys 64 carries a laterally projecting pin 67, which, upon depression of any of the keys, cooperates with a detent bar (not shown) to retain the key in its depressed position during the operation of the machine. Depression of a release key 68, also slidably mounted in the key frame 65, actuates the detent bar (not shown) to release the depressed multiple-item or single-item key. These keys are not otherwise released. Individual springs (not shown) return the multiple-item and single-item keys to their normal undepressed positions when released by depression of the release key 68 or by depression of another transaction key.

The purpose of dividing the transaction keys 63 and 64 into two distinct groups is to control the printing and paper feeding mechanisms with which the machine of the above-mentioned Shipley application is provided, to issue multiple-item receipts having printed thereon the amounts of a plurality of items and the total thereof, or to issue receipts having printed thereon the amount of a single-item transaction. To accomplish this, the groups of transaction keys control a differential mechanism to differentially adjust the controlling means for the printer and paper feeding mechanisms. The control of the printer mechanism per se is not pertinent to the present invention, but control of the paper feed by the transaction keys will be referred to, because advantage is taken of such variable control to effect the release of the clerk's keys at different times, depending upon whether the machine is handling a single or a multiple-item transaction.

Figure 1:
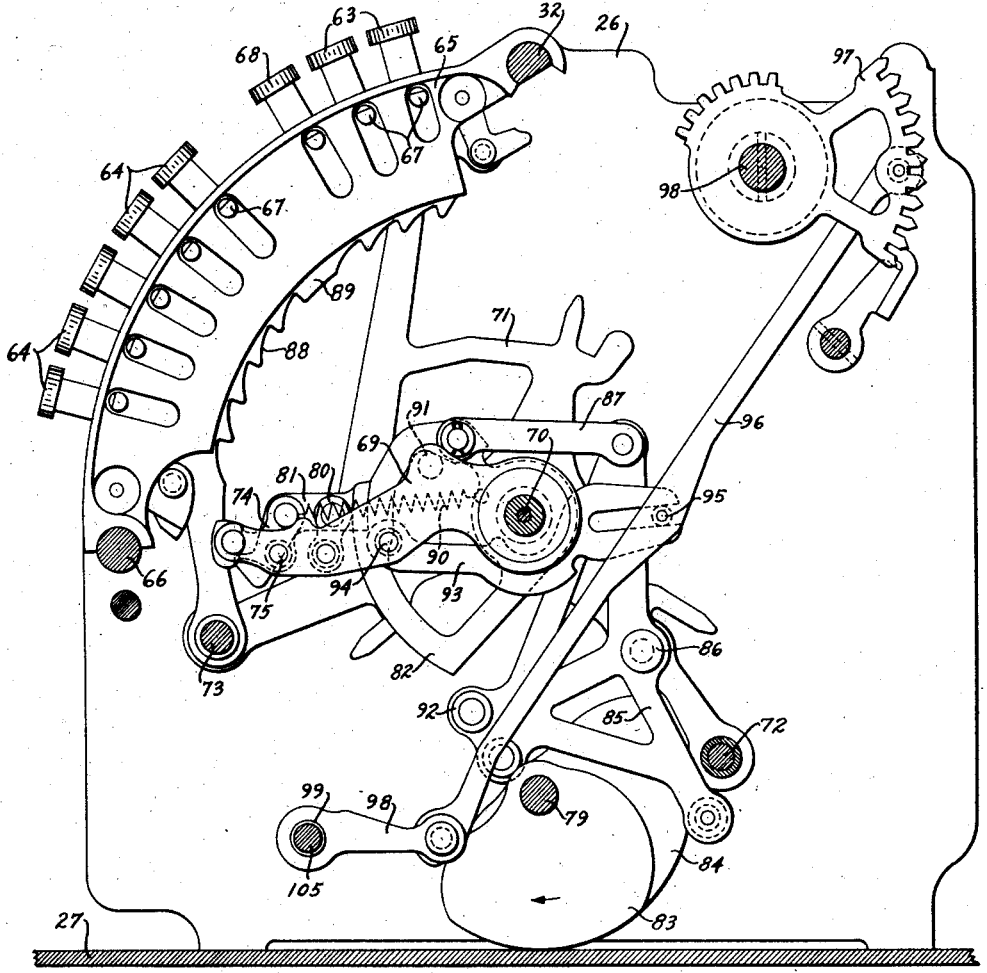

*Transaction differential mechanism.*—This differential mechanism, illustrated in Fig. 1 of the drawings, includes a differentially movable arm 69, pivotally mounted on a hollow stud 70 supported between hangers 71, (only one of which is shown herein), suitably supported on cross rods 72 and 73, extending between the side frames 25 and 26.

Depression of any one of the keys 63 or 64 interposes its inner end into the path of the forwardly extending arm of an elbow lever 74 (Fig. 1) pivotally supported at 75 on the free end of the differential arm 69. The other arm of the elbow lever 74 and a link 80, likewise pivotally mounted on the differential arm 69, support a latch 81 which normally connects the differential arm 69 to an actuator 82 pivoted on the stud 70.

A pair of cams 83 and 84, fast on a drive shaft 79, journaled in the machine side frames 25 and 26, receive one rotation in counter-clockwise direction at each operation of the machine to rock a cam lever 85, pivoted at 86, on the hanger 71, and having its upper end connected by a link 87 to the actuator 82 to rock the latter first clockwise an invariable extent of movement, and then counter-clockwise to its home position at each operation of the machine.

The actuator 82, due to the latch connection 81, carries the differential arm 69 therewith on its clockwise travel until the forwardly extending arm of the elbow lever 74 strikes, and is arrested by, the inner end of the depressed key 63 or 64, whereupon the elbow lever 74 rocks counter-clockwise to disconnect the latch 81 from engagement with the actuator 82, which continues its clockwise travel.

The disengagement of the latch 81 from the actuator 82 engages its forward end with the proper one of a series of notches 88 formed in the inner edge of an arcuate bar 89 having its lower end supported on the cross rod 73, and being secured at its upper end by an upwardly extending arm on the hanger 71, to retain the differential arm 69 in that position at which the elbow lever 74 encounters the inner end of the depressed key, the actuator 82, as it continues its travel, maintaining the latch 81 in locked position against the tension of the usual restoring spring 90.

The arm 69 is thus differentially positioned, according to the particular transaction key 63 or 64 depressed. The actuator 82, on its return, encounters a laterally projecting stud 91 on the differential arm 69 and restores the arm to its home position in a manner well known in this type of machine.

The differentially positioned arm 69, aided when necessary by a roller 92 mounted on the cam lever 85, transmits its differential movement to printing mechanism and indicating mechanism (not shown) through a minimum movement beam 93 having its forward end pivoted at 94 to the differential arm 69, and bifurcated at its rear end to embrace a stud 95 located intermediate the ends of a link 96, the beam extending beneath the stud 70, on which it fulcrums. The upper end of the link 96 is pivotally connected to a segment 97 mounted on a shaft 98 journaled in the machine side frames 25 and 26, and forming a part of the indicator positioning mechanism of the machine of the Shipley application. The lower end of the link 96 is pivoted to an arm 98 fast on the end of a sleeve 99 journaled on a shaft 105 mounted in the right side frame 25 and in the printer side frame 29 (Fig. 6).

Obviously, the differential arm 69, through the foregoing connections, differentially rotates the sleeve 99 to variably position a segment 106 (Fig. 6) attached to the opposite end of the sleeve. The segment 106 meshes with a segment 107 journaled on a stud 108 supported in the left side frame 26 and in the printer side frame 29, and having secured thereto a cam arm 109. The sector 110 connected to the segment 107, sets up the type carrier (not shown) associated with the row of transaction keys 63 and 64. The differentially positioned cam arm 109 is also utilized to control the key locking mechanism of the present invention, as will be described later, and, as set forth in the Shipley application mentioned above, the cam arm 109 controls the receipt feeding segment 46 to determine the length of the feed, thereby controlling the time of operation of clerk's key releasing mechanism.

*Transaction key control of paper feed.*—The differentially positioned cam arm 109 is provided with peripheral edges 111 and 112 of different radii to cooperate with a projection 113 on a slotted arm 114 journaled on a control shaft 55 extending between the left side frame 26 and the printer frame 29. A floating stud 115 on the upper end of a link 116, the lower end of which is pivoted to one arm of a bell crank lever 118 fast on a shaft 119 journaled in the machine side frames 25 and 26, projects through a slot in an arm 120 fast on the control shaft 55 and also through the slot in the loosely mounted arm 114.

It will be remembered that in the type of machine to which this invention is applied, the minimum movement beam 93 and the trains of mechanism adjusted thereby, among which are the indicating and printing mechanisms, remain at the end of any operation in the positions where last adjusted, until differently adjusted on a subsequent operation of the machine.

Therefore, the cam arm 109 may occupy any of the positions to which it may be adjusted, and merely for convenience the cam arm 109 is shown at one limit of its adjustment to which it would have been shifted under the control of the single-item transaction key 64 in lowest or "number 1" position.

An arm 148 (Fig. 3) fast on the control shaft 55 carries a pin 147 projecting between the adjacent parallel faces of a pair of centering arms 149 and 150 journaled on the shaft 55, the outer ends of which centering arms are connected by a spring 151 which presses the arms against the pin 147. A stud 152 on the arm 153 of a spider lever 49 pivoted on the control shaft 55, also projects between the pivoted companion arms 149 and 150.

Another arm 48 of the spider lever 49 carries a stud 47 adjustable into and out of a slot 56 (Fig. 2) formed in a receipt feeding segment 46 similar in construction and identical in purpose and operation with the feed segment disclosed in Figs. 27–29 of the above-mentioned Shipley application.

The feed segment 46 is suitably journaled on the outermost of a series of tubes, one only being shown, a spring (not shown) operating to rock the segment clockwise from its normal position, and a cam (also not shown) operating to restore the segment counter-clockwise to its normal or home position, all as fully explained in such Shipley application.

The stud 47 (Figs. 2 and 3) on the arm 48 is of such diameter relatively to the width of the slot 56 that when the stud is positioned within the slot it limits the travel of the feeding segment 46 so as to enable the latter to impart a single line space feed to the receipt paper, but when the stud 47 is withdrawn from the slot 56 in the feeding segment 46, the latter is free to complete a full stroke and impart an extra long advance to the receipt paper.

As it is desired to impart an extra long feed to the receipt paper on all single-item entering operations (as well as on all total taking operations, as hereinafter explained) it will be seen that the depression of any single-item transaction key 64, followed by an operation of the machine, will merely variously position the high sector 112 (Fig. 6) of the cam arm 109 relatively to the projection 113 of the slotted arm 114 to hold the latter at one limit of its travel, and because of the floating connection afforded by the stud 115 on the link 116, between the arm 114 journaled on the control shaft 55 and its companion arm 120 fast on the control shaft 55, the control shaft and its arm 148 are held at the clockwise limit of its oscillatory travel.

The stud 147 on the arm 148, therefore, holds the upper centering arm 149 at its clockwise limit of travel, and the latter, through its spring connection 151 with its twin arm 150, draws the latter to its clockwise limit of travel. The arm 150 in shifting to such position bears against the stud 152 on the arm 153 of the spider lever, rocking the latter and the arm 48 thereof to shift the stud 47 out of the slot 56 of the feeding segment 46 and enable the latter to impart an extra long advance to the receipt paper.

Operation of the machine following the depression of any of the multiple-item transaction keys 63 (Fig. 1) adjusts the differential train of mechanism leading from differential arm 69 to the intermeshed segments 106 and 107 (Fig. 6) to rock the cam arm 109 counter-clockwise to bring the low sector 111 thereof beneath the projection 113 on the slotted arm 114, whereupon a spring 121 attached to the arm 120 rocks the latter and the control shaft 55 counter-clockwise, and through the floating stud 115, draws the slotted arm 114 therewith, causing the projection 113 to follow down the shoulder between the high and low sectors 112 and 111 and rest upon the low sector.

The control shaft 55, in rocking counter-clockwise, carries with it the arm 148 (Fig. 3) and its stud 147, the latter of which presses the arm 150 counter-clockwise, tensioning the spring 151 which draws the companion arm 149 counter-clockwise, the arm 149 pressing against the stud 152 in the arm 153 of the spider lever 49 to rock the latter counter-clockwise and with it the arm 48, to shift the stud 47 into the wide slot 56 of the feed segment 46, so as to limit the travel of the latter to impart a single line space feed to the receipt paper.

*Automatic control of clerks' keys.*—Obviously in entering single-item transactions, it is desirable to shift the detent bar 36 to the right to release the depressed clerks' key 30 near the end of each of such single-item transactions, but when entering multiple-item transactions, it is desirable to retain the depressed clerks' key in depressed position throughout the entry of two or more such items, which requires that the detent bar 36 shall not be operated during the entry of any of the various items forming the multiple-item transaction, but shall remain effective until the total taking operation which forms a part of and completes each multiple-item transaction.

To effect these results, it is necessary to automatically control the detent bar 36 so that it will operate at every single-item operation to release the depressed clerks' key, and yet remain effective during the entry of the items constituting a multiple item transaction, to lock the clerk's key in depressed position and prevent the depression of any other clerks' key. Since it is only when the receipt paper receives the long feed, that is, on single-item entering operations and on total taking operations, that it is desired to release the clerk's key, advantage is taken of the movement of the feeding segment 46 to operate the clerk's key releasing mechanism.

When the feeding segment 46 rocks clockwise its full extent of travel, a laterally projecting stud 57 thereon wipes by the tail 58 of a key releasing pawl 59, pivotally supported at 54 on the key frame 31, rocking the release pawl idly counter-clockwise, the pawl being returned immediately to its normal position by the restoring spring 60 attached to its tail.

Near the end of a single-item or total-taking operation, the receipt feed segment 46 is given its counter-clockwise movement to feed the receipt out of the machine. On this counter-clockwise rotation, the stud 57 contacts with the right-hand side of the tail 58 and wipes by this tail, rocking the key release pawl 59 clockwise against the tension of the spring 60 to cause the nose 61 thereof to contact a laterally projecting stud 62 on the detent bar 36 and shift this bar towards the right to release the pin 34 of the depressed clerk's key 30 from its shouldered projection 35, whereupon the key spring (not shown) restores the key to undepressed position. As soon as the stud 57 clears the tail 58, the restoring spring 60 immediately returns the key release pawl 59 to its normal position. The short clockwise movement of the segment 46 under control of the stud 47, to line space the receipt paper between the items of a multiple-item transaction, is insufficient to carry the stud 57 into contact with the tail 58 of the releasing pawl, and consequently, the key releasing pawl 59 is not displaced on operations wherein the multiple-item transaction keys have been depressed.

*Total control lever.*—A total control lever 122 (Fig. 5) such as is provided in the Shipley application, Serial No. 687,305, mentioned above, to condition the machine for taking totals and sub-totals from the totalizer or totalizers with which the machine is provided, is also provided in the present machine. This total lever controls the receipt feed segment 46 to impart a long feed to the receipt paper and to effect the release of the depressed clerk's key. This lever also controls the machine to otherwise effect the operation of the present invention, as hereinafter set forth.

The total control lever 122 (Fig. 5) projects radially from a substantially circular control disk 123, shown partly broken away for clearness, having its hub 124 journaled on a stud 125 projecting inwardly from the right side frame 25 of the machine, and has a plurality of positions to which it may be adjusted to control the register in the performance of its various functions, such as adding, total-taking and sub-total taking. Movement of the total control lever 122 from its adding position to any one of its total or sub-total taking positions, sets up a condition whereby, upon operation of the machine, the spider lever 49 (Fig. 3) is rocked clockwise to prepare the feeding mechanism to feed the receipts out of the machine.

When the total control lever 122 is adjusted to one of its total or sub-total taking positions, a cam slot 126 (Fig. 5) therein acting on a stud 127 in an arm 128 of a lever 129 pivoted at 135, rocks the lever 129 counter-clockwise. A spring 136 holds another arm 137 also pivoted at 135, in cooperative relation with an arm 138 of the lever 129 to form a cam slot 139 through which projects a stud 140 on an arm 141 fast on a shaft 119 journaled in the main side frames 25, 26.

The lever 129, when rocked counter-clockwise, operates through the cam slot 139 to rock the arm 141 and shaft 119 slightly clockwise, and with them the lever 118 (Fig. 6) fast on the shaft 119 near the bank of clerks' keys, to slide a forked link 143, pivoted to one arm of the lever 118, in the direction of its length towards the control shaft 55.

The link 143 carries a projection 145, which, upon the movement of the link towards the control shaft 55, contacts an arm 146 fast on the control shaft 55 to cam the arm and said shaft slightly clockwise. It should be remembered that at the end of the entry of a multiple-item the arm 146 is in its extreme counter-clockwise position, and not in the position shown in Fig. 6. The arm 148 (Fig. 3) fast on the control shaft 55 rocks therewith to press the stud 147 upwardly against the arm 149 journaled on the control shaft 55, to rock the latter clockwise, if it is at its counter-clockwise limit of travel, thereby tensioning the spring 151 to tend to draw the twin arm 150 upwardly against the stud 152 on the arm 153 of the spider lever 49 pivoted on the control shaft 55, to rock the spider lever in clockwise direction.

This clockwise movement of the spider lever 49, at this time, however, is not sufficient to completely withdraw the stud 47 on the arm 48 of the spider lever from the slot 56. As is well known, and as clearly set forth in the Shipley application referred to, a total-taking operation in machines of the class disclosed herein consists of two cycles of operation. During the first cycle of the total-taking operation the paper is given a short feed to space the last printed item from the total. Therefore, since the stud 47, on the arm 48 of the spider lever, is not withdrawn from the slot 56 by the manual movement of the lever 122, the stud 47, limits the feeding movement of the segment 46 to effect a short feed. Therefore it is not desired to feed the receipt paper its longest extent, or to release the depressed clerk's key until quite near the end of the second cycle of a total taking operation. Means is, therefore, provided to rock the shaft 119 an additional distance later in the total taking operation.

The manual clockwise movement (Fig. 6) imparted to the lever 118 by the total lever 122, also lowers the link 116 which draws the floating stud 115 downwardly in the slot of the companion arms 114 and 120, and, due to the contour of the slot in the arm 114, rocks this arm clockwise about the control shaft 55 to raise the projection 113 out of the path of the sector 112 of the cam arm 109. The purpose of this is to withhold the projection 113 from cooperative relation with the cam arm 109 during the total taking operation, as the cam arm is differentially actuated twice on such operations, once on the first cycle, and once on the second cycle.

Pinion 176 (Fig. 7) journaled at 177 and driven from a handle 175, and pinion 174 fast on the drive shaft 79 mesh with a large recessed gear 173 journaled on a stud 162 projecting from the side frame. Either pinion may be used to rotate the gear 173, which is given one-half of a rotation at each adding operation of the machine, and a complete rotation at each totaling operation of the machine, in the well-known manner common in machines of this type.

A cam disk 164 also journaled on the stud 162 in front of and of less diameter than the drive gear 173, fits in the recess in the gear and has a cam groove 163 formed in its outer face, the inner wall of the came groove having a laterally extending seat 159. A pitman 161 longitudinally slotted intermediate its ends to embrace the stud 162, extends diametrically across the face of the cam disk 164 and carries a roll 160 on its inner face normally accommodated in the seat 159.

A coupling slide 171 is shiftable along a way 158 (shown in dotted lines) formed diametrically across the rear face of the cam disk 164, one end of the coupling slide having an out-turned lip 170 normally lying within the plane of the periphery of the cam disk 164 which is notched at this point to enable the lip 170 to be embraced between spaced pins 169 projecting inwardly from the pitman 161, the relation of the cam disk 164 and drive gear 173 being such that the effective end of the coupling slide 171 lies opposite a notch 172 formed in the outer wall of the central recess in the drive gear 173 when the machine is at rest.

The drive gear 173 rotates relatively to the cam disk 164 during the accumulation of amounts, there being two diametrically opposed notches 172 in the drive gear so that at the end of each half rotation of the gear 173, one or the other of such notches lies opposite the effective end of the coupling slide 171.

One end of the pitman 161 is pivoted to one arm of a lever 165 pivoted at 166, a link 167 connecting the opposite arm of the lever with a crank 168 fast on the shaft 119 controlled by the total lever.

Figure 5:
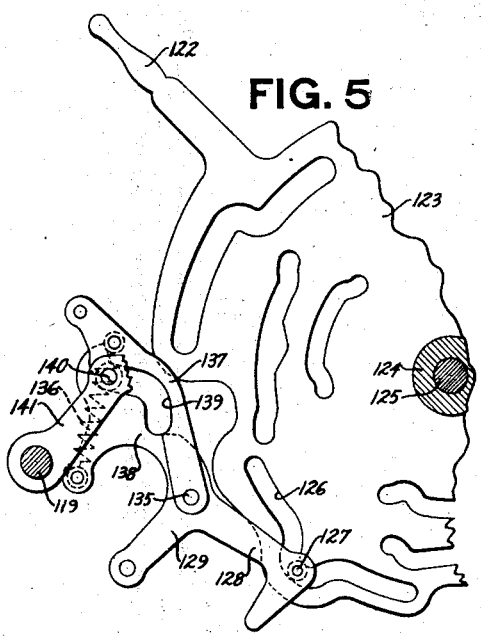
Fig. 5 is a fragmentary view of the total control lever and a part of the mechanism adjusted thereby.

It will be remembered that manual adjustment of the total control lever 122 from its "add" position, in which it is shown in Fig. 5, to any one of its total taking positions, rocks the shaft 119 slightly clockwise. This movement of the shaft 119, through the link 167 and lever 165, draws the pitman 161 towards the left, as viewed in Fig. 7, to withdraw the roll 160 from its seat 159 into the cam groove 163. The pitman 161 also draws the coupling slide 171 towards the left to insert the effective end thereof partway into the notch 172 in the drive gear 173, to connect the gear and the cam disk 164 so that they shall rotate in unison.

Near the end of the first cycle of a total-taking operation, the cam groove 163 in the disk 164 imparts an additional movement towards the left to the pitman 161. Then near the end of the second cycle, the cam disk 164 draws the pitman 161 towards the right to its intermediate position.

The additional movement to the left, imparted to the pitman 161 by the contour of the cam groove 163, causes the pitman to rock the lever 165, and, through the link 167 and crank 168, rocks the shaft 119 and the bell crank lever 118 (Fig. 6) farther in clockwise direction. The bell crank lever 118, in turn, thrusts the slotted link 143 farther towards the right to press the projection 145 against the arm 146 and rock the control shaft 55 and its arm 146 farther in clockwise direction, and the arm 148 through the yielding connection heretofore explained, rocks the spider lever 49 farther in clockwise direction to disengage the stud 47 (Fig. 2) from the slot 56, and free the feed segment 46 to make its maximum clockwise travel. This additional clockwise movement of the bell crank lever 118 (Fig. 6) also lowers the link 116 which draws the floating stud 115 downwardly in the slots of the companion arms 114 and 120, but this movement of the floating stud 115 is an idle one since the lower straight ends of the slots in the companion arms register with each other, they having previously been brought into such relation by the manual movement of the total lever, as hereinbefore described.

In the latter half of the second cycle of the total taking operation, the cam disk 164 (Fig. 7) restores the pitman 161 to the right to its intermediate position. And the pitman, through the lever 165, link 167 and arm 168, rocks the shaft 119 and the bell crank lever 118 (Fig. 6) counter-clockwise to their intermediate positions to draw the slotted link 143 towards the left, releasing the arm 146 and the control shaft 55 for partial restoration. However, at this time, the receipt feeding segment 46 has not completed its counter-clockwise or feeding operation, for which reason it is necessary to delay the counter-clockwise movement of the spider lever 49 to prevent interference of the stud 47 with the feed segment 46 as the segment returns to its home position. Mechanism is therefore provided, to delay the counter-clockwise movement of the control shaft 55 and of the spider lever 49 until quite near the end of the total taking operation.

Figure 3:
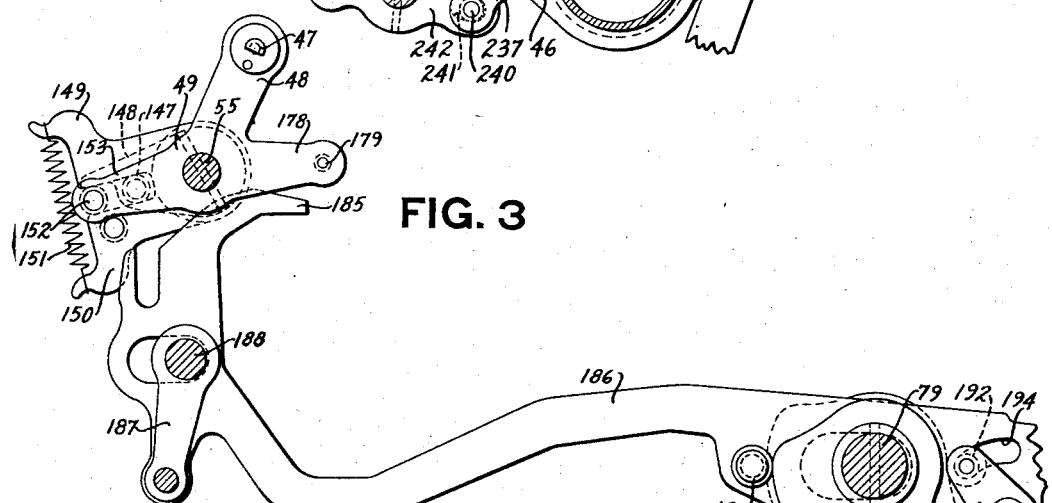
Fig. 3 is a detail view of the mechanism for holding the control shaft in the position to which it is adjusted, until the end of the operation.

A third arm 178 (Fig. 3) of the spider lever 49 carries a stud 179 adapted to cooperate with a tail 185 on the upturned end of a pitman 186 pivotally connected to a supporting arm 187 and slotted near its opposite end to embrace and be supported by the drive shaft 79, as viewed in Fig. 3. The supporting arm 187 is journaled on a cross rod 188 which passes through a clearance opening in the pitman 186. A pair of cams 189 and 190, fast on the drive shaft 79, are given one complete rotation in a clockwise direction at each operation of the machine. The cam 189 cooperates with a roller 191 projecting from the pitman 186. The cam 190 cooperates with a roller 192 projecting from an arm 193 pivotally supported on the pitman. The roller 192 projects through a concentric slot 194 in the pitman, and a spring 195 attached to the tail of the arm holds the roller yieldingly in contact with the periphery of the cam 190. The purpose of this yielding construction is to prevent damage to the mechanism should the tail 185 catch and be held by the stud 179 as the pitman is moved towards the right.

When the control shaft 55 rocks clockwise at the beginning of the total taking operation under the influence of the mechanism disclosed in Fig. 7, the stud 147 (Fig. 3) on the arm 148, fast on the control shaft 55, carries the arm 149 therewith and tensions the spring 151 to rock the companion arm 150 and the spider lever 49 also in clockwise direction to position the stud 179 on the arm 178 of the spider lever 49, below the path of travel of the tail 185 of the pitman 186.

Immediately after the stud 179 is so positioned, the cams 189 and 190 draw the pitman 186 towards the right, which shifts the tail 185 of the pitman to a position directly above the stud 179, to lock the stud 179 in its lowest position, and hold the spider lever 49 in its adjusted position, to prevent the spider lever from rocking counterclockwise. The spider lever, in turn, by reason of the stud 152 on its arm 153 projecting beneath the arm 148 fast on the control shaft 55, holds this arm and the control shaft 55 likewise against counter-clockwise movement until the cams 189 and 190 shift the pitman 186 towards the left.

This movement of the pitman 186, as can be seen by reference to Fig. 3, occurs just at the end of the total taking operation, and it is not until quite near the end of the leftward movement of the pitman that the tail 185 frees the stud 179 and the spider lever 49. Immediately thereafter, the spring 121 (Fig. 6) partially restores the shaft 55 and the spider lever 49, the restoring movement being arrested by the arm 146 striking the stud 145 on the slotted link 143.

After the completion of the total taking operation, the total control lever 122 (Fig. 5) is manually restored to its "adding" position, during which restoration the contour of the slot 126 acting on the stud 127 rocks the lever 129 clockwise to its normal position, which lever, in turn, rocks the arm 141 and the shaft 119 counter-clockwise to their home positions. The shaft 119, in turn, through the arm 168, (Fig. 7) link 167, and the lever 165 slides the pitman 161 towards the right to enter the stud 160 in its seat 159 in the inner wall of the cam slot 163 and disengage the coupling slide 171 from engagement with the drive gear 173. Also, the shaft 119, on its counter-clockwise rotation, draws the slotted link 143 (Fig. 6) to the left to its normal position, and lifts link 116, causing the floating connecting stud 115 to traverse the slots in the arms 114 and 120 and restore the arms to their home positions.

The control shaft 55, when rocked counter-clockwise to its normal position by the spring 121 (Fig. 6), carries with it the arm 148 (Fig. 3) the stud 147 of which presses the twin arm 150 counter-clockwise and through the connecting spring 151 draws the arm 149 counter-clockwise, the arm 149 acting upon the stud 152 of the arm 153 of the spider lever 49 to rock the latter with its arm 48 counter-clockwise and enter the stud 47 into the slot 56 (Fig. 2) of the feed segment 46 to limit the effective throw of the segment to single space the receipt paper.

The foregoing mechanisms are old as regards the present invention, and constitute a part thereof only insofar as they coact with the invention to obtain the results now to be set forth.

Machines of the type disclosed in the above-mentioned Shipley application are normally locked against idle operation. The locking mechanism (not shown) is readily released to permit operation of the machine, by rocking a release shaft which controls a clutch mechanism (not shown), and which also completes a circuit through an electric motor or other driving means. In the present disclosure, a suitably journaled shaft 196 (Figs. 2, 4 and 7) corresponds to Shipley's release shaft and is constantly urged to rock in clockwise direction by a drive spring 210 (Fig. 7) to be described later, to release the machine for operation. Means under the control of both the multiple-item transaction and the single-item transaction keys, is provided in the Shipley machine to prevent releasing movement of the release shaft until one of the transaction or control keys is depressed.

Heretofore it has been customary, as shown in Fig. 9, of the above-named Shipley application, to prevent operation of the release shaft, by securing a restraining arm fast thereon and locking it against operation by a spring-actuated dog, shiftable by a key-operated control bar having a pin projecting over to contact the dog.

The Shipley disclosure fully explains the control of the release shaft by the transaction or control keys.

The present invention is designed to prevent the intentional or accidental depression of a clerk's key during the entry of a multiple-item transaction, which would result in the restoration of that clerk's key, depression of which was required before the machine could be operated.

And as one convenient means to attain this end, there is provided a lock for the clerks' keys 30, controlled by the transaction keys 63 and 64 and the total control lever 122. Such novel mechanism resembles that shown in the Shipley application in connection with the control keys, but differs therefrom by providing a flexible structure as opposed to the rigid structure of the prior art, whereby the depressed clerk's key will be locked in depressed position throughout the successive entries of items constituting a multiple-item transaction which function is not present in the Shipley structure.

To this end, therefore, the clerks' keys 30 (Fig. 2) control flexible means to normally restrain the release shaft 196 against releasing movement in clockwise direction, so that depression of one of the keys 30 is necessary to operate the restraining means to free the shaft 196 to the action of the tensioned drive spring 210 (Fig. 7) compressed between the bottom of the slot 211 in a link 212 and a pair of spring clips 213, one on each side of the link 212, both being pivoted on a stud 214 projecting into the slot 211 from an arm 215 fast on the shaft 196.

The stud 214 guides the upper end of the link 212, the lower end of the link being guided by a slot 216 straddling a stud 217 on the right-hand end of the pitman 161. As soon as the shaft 196 is free to rock, the spring 210 expands and rocks the shaft clockwise to release the machine for operation, at the same time, rendering the clutch mechanism effective and closing the contact of an electric circuit to energize the drive motor.

In the present disclosure, the spring 44 (Figs. 2 and 4) normally holds a tooth 197 of the dog 43 in the path of a projection 198 on a restraining arm 199 mounted on the release shaft 196, to lock the release shaft, but unlike the prior art, the restraining arm 199 is journaled on the release shaft 196 and carries a stud 200 projecting across the path of a nose 201 on a collar 202 fast on the release shaft 196 to prevent clockwise or releasing movement of this shaft. A spring 203 coiled about the release shaft 196 and having one end thereof anchored to a projection 204 of the collar 202 and the other end to the stud 200 on the restraining arm 199, tends to rock the restraining arm 199 counter-clockwise to hold the stud 200 in contact with the nose 201 on the collar 202.

The normal sequence of operations to free the release shaft 196 after the desired amount keys, not shown, have been depressed, in the machine of the Shipley application, with which the present invention is associated, is to first depress a clerk's key 30, thereby actuating the control bar 40 to rock the dog 43 and remove the tooth 197 thereon from the path of the projection 198 on the restraining arm 199 of the release shaft. The provision of the dog 43 and restraining arm 199 enforced the depression of a clerk's key. The particular control or transaction key, that is, either a single-item key 64 or a multiple-item key 63, is then depressed, to disable the special restraining means for the release shaft shown in Fig. 9 of Shipley's application, and thereafter a starting key is depressed to displace the regular locking pawl, as shown in Shipley's patent, No. 1,602,596, dated October 12, 1926.

It is not necessary, however, to follow the exact sequence of operations as the desired control key may be depressed first, after which a clerk's key 30 may be depressed. In this latter case, the tendency of the release shaft 196 to rock clockwise under the influence of the drive spring 210 (Fig. 7) to release the machine for operation will be blocked by the dog 43, and, to release the machine, it is then necessary to depress a clerk's key 30 to disable the dog 43 thereby releasing the last restriction on the operation of the release shaft 196, whereupon the tensioned drive spring 210 (Fig. 7) pressing against the stud 214 on the arm 215 fast on the release shaft, rocks the release shaft to free the machine for operation, the stud 214 traveling towards the upper end of the slot 211 in the link 212. A lever 207 pivotally mounted at 166 carries a pin 208 at its free end normally seated in an offset notch of an opening 209 in the slotted link 212 to support the latter in its normal position against the tendency of the spring 210 to force the link downwardly.

Figure 7:
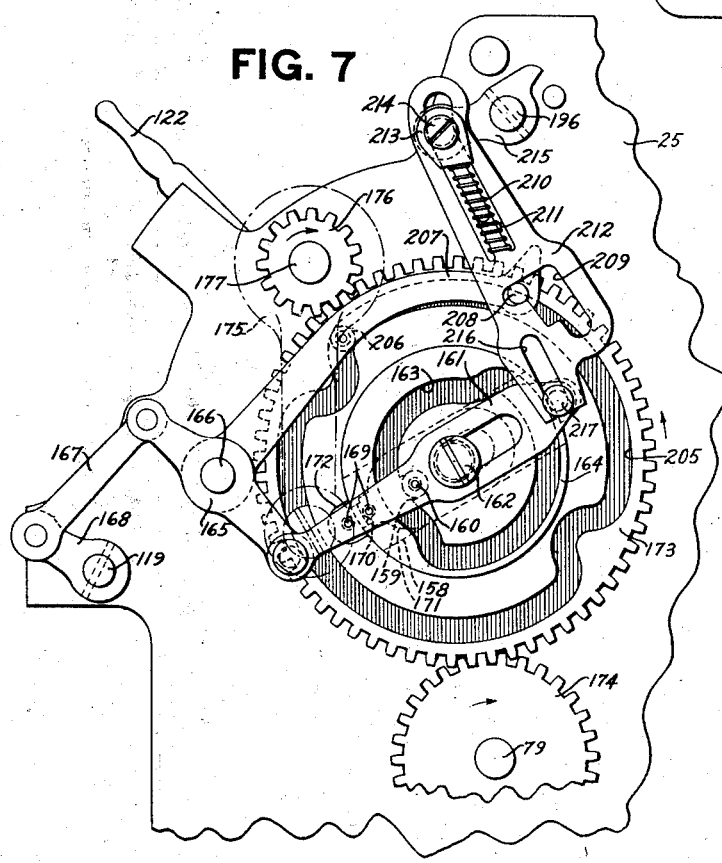
Fig. 7 is a detail view in right elevation of that part of the means for controlling the clerk's key releasing mechanism.

Near the end of each operation of the machine, mechanism illustrated in Fig. 7 operates to rock the release shaft 196 counter-clockwise, as viewed in the drawings, past its normal position, to release the depressed amount keys, (not shown) and to bring the machine to rest in its home position, the shaft 196 being then turned slightly clockwise by the spring 210 to its normal position, as usual.

A cam groove 205 in the face of the drive gear 173 coacts with a stud 206 projecting thereinto from the lever 207, to rock the lever first clockwise and then counter-clockwise to normal. The lever 207, upon its clockwise travel, draws the link 212 downwardly to rock the arm 215 and release shaft 196 counter-clockwise past their normal home positions, the stud 214 having assumed its position at the top of the slot 211 when the machine was released for operation.

The collar 202 with its nose 201 (Figs. 2 and 4) rocks with the release shaft 196 in counter-clockwise direction past its normal home position, and due to the coil spring 203 the arm 199 is rocked counter-clockwise and the nose 198 is moved past the tooth 197 of the dog 43. The cam groove 205 then operates to raise the link 212, whereupon the spring 210 rocks the shaft 196 and arm 215 and collar 202 clockwise to normal. The nose 201 of the collar 202, by its contact with the stud 200 rocks the arm 199 clockwise to normal. The shaft 196, arms 215 and 199, and the collar 202 are prevented from being rocked farther in a clockwise direction, at this time, by the restraining means disclosed in Shipley's application, and in his patent, No. 1,602,596, above mentioned. Therefore, the link 212, on its upward travel and after the shaft 196 and its associated parts reach their normal positions, compresses the spring 210 preparatory to another operation of the machine. The release shaft 196 on its counter-clockwise travel does not operate the detent bar 36 to release the depressed clerks' keys 30, which detent bar, nevertheless, on single-item entering transactions and on total-taking operations must be operated to enable the depressed clerk's key 30 to return to its normal position, thereby removing the key pin 34 from the inclined edge 41 of the control bar 40, so that the latter can be restored by the spring 44 (Fig. 4) acting upon the dog 43, to restore the tooth 197 to its effective position over the projection 198 of the restraining arm 199 and lock the machine against operation until a clerk's key has again been depressed.

On the other hand, when entering the items of a multiple-item transaction, it is desirable to not only prevent release of the depressed clerk's key 30, but also prevent the depression of another key 30 until after all of the items comprising the particular transaction have been registered, and the total of the items entered has been taken, thereby completing the multiple-item transaction. One convenient means to effect these results is as follows:

After the withdrawal of the dog 43 by the depression of the clerk's key 30, the drive spring 210 (Fig. 7) rocks the release shaft 196 clockwise to release the machine for operation, and the nose 201 on the collar 202 presses against the stud 200 of the yielding restraining arm 199 to rock the restraining arm 199 therewith in clockwise direction. This positions a shoulder 221 on the arm 199 in the path of a beak 222 on the detent bar 36, thereby blocking any movement of the detent bar towards the right to release the depressed clerk's key 30, and by preventing such movement of the detent bar, those keys 30 which are in normal undepressed positions cannot be depressed. The release shaft 196, however, as above described, rocks counter-clockwise near the end of each item-entering operation to release the depressed amount keys, and at such times, if permitted, would operate through the collar 202 and coil spring 203 to restore the restraining arm 199 to its idle position, thereby freeing the detent bar 36 for operation, which would enable a clerk to mismanipulate the clerks' keys, as heretofore explained.

To retain the shoulder 221 of the restraining arm 199 in the path of the detent bar 36 to prevent the release thereof by the release shaft, on multiple-item entering transactions, provision is made to latch the restraining arm 199 in its effective position until a totalizing operation is made following the series of item entering operations under the control of the multiple-item keys 63 (Fig. 1).

One convenient means to accomplish this result is the provision of a latch lever 223 (Fig. 2) pivoted intermediate its ends at 224 to the left side frame 26 of the machine. One arm 225 of the latching lever 223 carries a hook 226 constantly pressed by a spring 227 against the peripheral edge of the restraining arm 199.

The restraining arm 199, on its clockwise adjustment, under the influence of the collar 202, brings a shoulder 228 thereof into alignment with the hook 226 on the latching lever 223, and as the shoulder 228 registers with the hook 226, the spring 227 rocks the latching lever 223 counter-clockwise to engage the hook with the shoulder, and hold the restraining arm 199 in the effective locking position to which it is adjusted by the clockwise rotation of the release shaft 196.

In consequence, when the release shaft 196 is rocked counter-clockwise, as above described, near the end of an item entering operation of a multiple-item transaction, to release the amount keys (not shown) and to bring the machine to rest in its home position, the latching lever 223 holds the restraining arm 199 in the position to which it was adjusted when the release shaft 196 rocked clockwise to release the machine for entry of an item of a multiple-item operation. The counter-clockwise movement of the release shaft 196 carries the collar 202 therewith, placing additional tension on the coil spring 203. In this position, it will be remembered, the shoulder 221 on the restraining arm 199 blocks release of the depressed key 30, as well as depression of the undepressed keys in that bank, by cooperating with the beak 222 of the detent bar 36 to prevent operation of the detent bar.

The hook 226 retains the arm 199 in effective position with the shoulder 221 in blocking position throughout a series of item entering operations under the control of a multiple-item key 63 until the total of the series of items is taken.

Near the end of a totalizing operation of a multiple-item transaction, the latching lever 223 is rocked clockwise to release the restraining arm 199 so that the detent bar 36 may be operated in the above described manner to release the depressed keys 30 and enable the control bar 40 to free the dog 43 for effective operation.

The release of the latching lever 223 is effected by a tripping hook 235 (Fig. 2) extending rearwardly from a tripping bar 236 slidably mounted on suitably supported studs 237, and adapted to contact a stud 238 projecting from the remaining arm 239 of the latching lever 223. A stud 240 on the tripping bar 236 projects through a slot 241 in an arm 242 fast on the control shaft 55.

Movement of the total control lever 122 (Fig. 5) when adjusted from its "add" position to its totalizing position, sets the various elements of the machine to perform a totalizing operation, and, as described above, rocks the shaft 55 and its arm 242 slightly clockwise, thereby sliding the tripping bar 236 a short distance toward the left, to bring the tripping hook 235 closely adjacent to stud 238 on the latching lever. This movement, however, is not sufficient to bring the tripping hook into contact with the stud 238, but merely positions the parts for effective operation later. Near the end of the first cycle of a totalizing operation, the mechanism illustrated in Fig. 7, and hereinbefore explained, operates to impart an additional clockwise movement to the control shaft 55 and its arm 242, which draws the tripping bar 236 farther towards the left to rock the latching lever 223 clockwise, and releasing the restraining arm 199 to the action of its tension spring 203, which immediately acts to restore the restraining arm 199 to its idle position, and to free the detent bar 36 to the action of the key releasing pawl 59 heretofore described.

The spring 203 rocks the restraining arm 199 counter-clockwise until it is arrested by contact of the stud 200 against the shoulder 201 on the collar 202. Thereafter the receipt feed segment 46 is rocked back to its normal position in the manner described above, during which movement the stud 57 thereon wipes past and rocks the key release pawl 59 clockwise, causing the nose 61 of the pawl to strike the stud 62 on the detent bar 36 and shift the bar to the right to release the depressed clerk's keys 30.

The usual spring (not shown) thereupon returns the depressed key 30 to its normal outer position. As the stud 57 of the receipt feed segment 46 escapes from the key release pawl 59, the pawl is restored to idle position by the spring 60, whereupon the spring 39 restores the detent bar 36 to its normal position preparatory to depression of another key 30.

As the depressed key 30 moves to its outward position, the spring 44 (Figs. 2 and 4) rocks the dog 43 clockwise to slide the control bar 40 towards the right to its normal position, and to place the tooth 197 of the dog in the path of the projection 198 on the restraining arm 199, whereby the machine is locked against release for operation until a key 30 is again depressed.

The release shaft 196 is not rocked counter-clockwise until quite near the end of the operation, but the cam groove 163 in the cam disk 164, (Fig. 7) through its train of connecting mechanism, acts to partially restore the control shaft 55 during the second cycle of the total taking operation, which would slide the trip bar 236 toward the right and permit the spring 227 to re-establish effective engagement of the hook 226 with the shoulder 228 so that when the cam groove 205 operates on the lever 207 and link 212 to rock the shaft 196 counter-clockwise, the restraining arm 199 would still be held in locked position. However, it will be remembered that the tail 185 (Fig. 3) of the pitman 186 delays the restoring movement of the control shaft 55 under the influence of the spring 121, until just at the end of the operation. This, of course, delays the return of the trip bar 236, which will continue, therefore, to retain the latch lever 223 in ineffective position until quite near the end of the operation of the machine. When, at the end of the operation of the machine, the stud 179 escapes the tail 185 of the pitman 186, the spring 121 (Fig. 6) rocks the control shaft 55 counter-clock, sliding the tripping bar 236 towards the right to release the latch lever 223 to the action of the spring 227 which now rocks the latch lever 223 counter-clockwise until the nose 226 thereof rests upon the periphery of the restraining arm 199, which arm was shortly before restored to its normal position.

After the completion of the multiple-item total taking operation, the total control lever 122 is restored manually to its "add" position which, by the mechanism disclosed in Fig. 5, restores the shaft 119 and the bell-crank lever 118 counter-clockwise to normal. This slides the slotted link 143 towards the left to withdraw the projection 145 from beneath the arm 146, whereupon the spring 121 rocks the control shaft 55 counter-clockwise to normal position to slide the trip bar 236 farther towards the right to its normal position apart from the stud 238 on the latch lever 239 to allow the latter to snap into effective position.

Thus, the trip bar 236 through its hook 235, retains the latch lever 223 in idle position with its hook 226 clear of the shoulder 228 on the restraining arm 199 until the very end of an operation of the machine. thereby permitting the coil spring 203 to rock the restraining arm 199 counter-clockwise when the shaft 196 and the collar 202 are rocked counter-clockwise near the end of the operation, as set forth above.

The detent bar 36 is now free to be slid towards the right by depression of a key 30, preparatory to another operation of the machine.

On single-item transactions, which are complete transactions in themselves, it is not desired that the latching lever 223 shall retain the restraining arm 199 effective to lock the detent bar 36 against release of the depressed key 30, or to prevent the depression of another key after the termination of the operation. For this reason the cam arm 109 (Fig. 6) under the control of a single-item key 64, rocks the control shaft 55 clockwise early in the single-item operation of the machine, to slide the tripping bar 236 towards the left and rock the latching lever 223 clockwise to ineffective position. These parts are held in these positions with the latching hook 226 of the lever 223 clear of the shoulder 228 on the restraining arm 199, as long as the machine is operated under the control of any single-item key 64 (Fig. 1), as set forth above.

Hence, although the restraining arm 199 rocks to interpose its shoulder 221 into the path of release of the detent bar 36, the latch lever 223 is not permitted to engage the shoulder 228 on the restraining arm.

Therefore, when the release shaft 196 is reversely rotated past its normal home position near the end of the operation of the machine, the spring connection 203 between the release shaft and the restraining arm 199 operates to restore the latter with the release shaft to withdraw the shoulder 221 from the path of the detent bar 36, whereupon the feed segment 46 on its counterclockwise return to normal, causes its stud 57 to rock the release pawl 59 against the stud 62 of the detent bar 36 to slide the latter to the right (Fig. 2) to release the depressed clerk's key.

Thus, the clerk's key bank is cleared so that another clerk can depress his own key previously to an operation of the machine.

Figure 2:
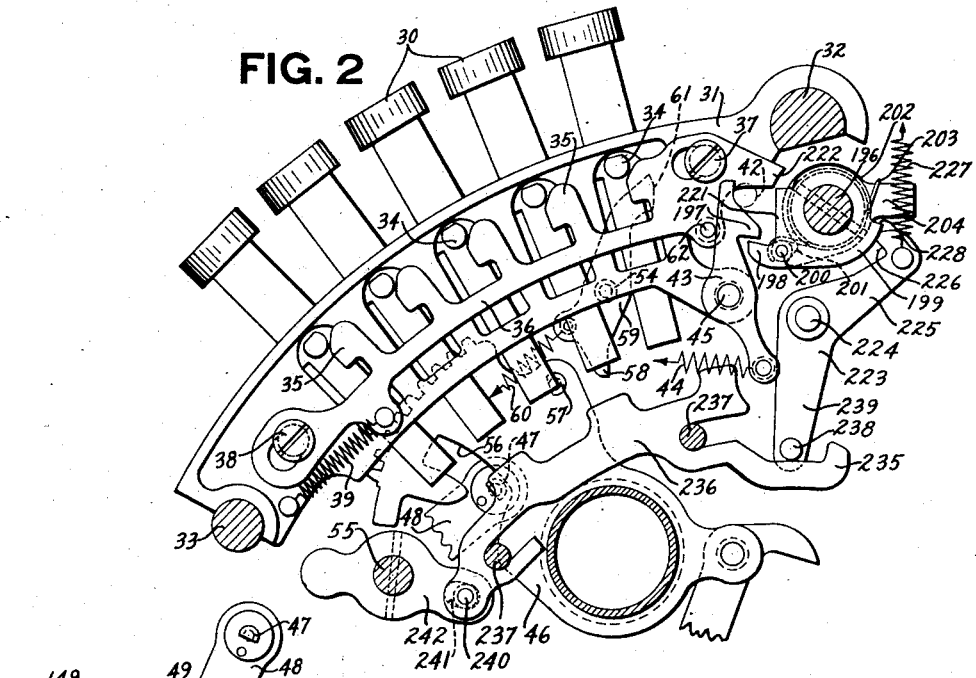
Fig. 2 is a detail view in right elevation of the bank of clerks' keys and the mechanism for locking the depressed clerks' keys against release during multiple-item transactions.

In Fig. 2 of the drawings, the parts are shown with the machine at rest subsequently to a total taking operation, which has left the trip bar 236 in idle position relatively to the latch lever 223, to permit the latter to operate.

But, in Figs. 1 and 6, the parts are shown in the positions assumed subsequently to an operation of the machine with a single-item key 64 depressed, during which operation the high sector 112 (Fig. 6) of the cam arm 109 has been rocked beneath the projection 113 on the slotted arm 114, whereby to shift the control shaft 55, lever 242 and trip bar 236 to the positions opposite those in which they are shown in Fig. 2, the parts remaining where shifted until otherwise adjusted.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed as new, is:

1. In a machine of the class described; the combination with a group of manipulative keys; and a normally restrained release shaft adapted to be rocked to release the machine for operation; of a lock for the release shaft; key-operated means to disable the lock and free the release shaft for operation; a manipulatively controlled detent to lock the keys either in depressed position or undepressed position; and means positioned by the release shaft as the shaft moves from normal position to restrain the detent against movement to unlocking position after the release shaft returns to normal.

2. In a machine of the class described; the combination with a group of manipulative keys; and a normally restrained release shaft adapted to be rocked to free the machine for operation; of a lock for the release shaft; key-operated means to disable the lock and release the shaft; a manipulatively-controlled detent to lock the keys in depressed position or in undepressed position; and an arm adapted to be rocked by the shaft as the shaft moves from normal position, to obstruct movement of the detent to unlocking position after the release shaft returns to normal.

3. In a machine of the class described; the combination with a group of manipulative keys; and a normally restrained release shaft adapted to be rocked to free the machine for operation; of a restraining arm on the release shaft; a dog cooperating with the restraining arm to normally lock the release shaft in its home position; key-operated means to rock the dog to free the shaft; a manipulatively controlled detent to lock the keys in actuated position or in normal position; and means on the restraining arm adapted, when the release shaft is rocked to release the machine, to lock the detent in effective position to prevent the return to normal position of an actuated key, and the actuation of another key.

4. In a machine of the class described; the combination with a group of manipulative keys; and a shaft adapted to be rocked to release the machine for operation; of a restraining arm on the shaft, adapted to be rocked with the shaft; a dog cooperating with the restraining arm to restrain the shaft; key-operated means to disengage the dog from the restraining arm to free the shaft; a manipulatively controlled detent to lock the keys in depressed or in undepressed position; means on the restraining arm adapted, when the shaft is rocked to release the machine, to lock the detent against movement to unlocking position; and means to latch the restraining arm in its adjusted position when the release shaft returns to normal.

5. In a machine of the class described; the combination with a group of manipulative keys; a normally locked shaft adapted to be rocked to release the machine for operation; and a detent associated with the keys; of an arm journaled on the release shaft and adapted, when rocked in one direction, to lock the detent to prevent alteration in the positions of the keys; a collar fast on the release shaft to rock the arm to locking position; means to restore the arm to normal position; and means to latch the arm in its moved position.

6. In a machine of the class described; the combination with a group of manipulative keys; a normally locked shaft adapted to be rocked to release the machine for operation; and a detent associated with the keys; of an arm journaled on the release shaft and adapted, when rocked in one direction, to lock the detent to prevent alteration in the positions of the keys; a collar fast on the release shaft to rock the arm to locking position; and means to restore the arm to normal position.

7. In a machine of the class described, the combination with a group of manipulative keys; a detent to lock any one of the keys in depressed position and the remainder in undepressed positions; and a shaft to release the machine for operation; of a restraining member journaled on the release shaft; means fast on the shaft to insure the rotation of the restraining member with the release shaft in one direction; means to restore the restraining member to its normal position; a dog normally engaged with the restraining member to prevent rotation of the release shaft in one direction; means operated by a key, when depressed, to disengage the dog from the restraining member to free the shaft; and means on the restraining member to lock the detent against releasing movement when the shaft rotates.

8. In a machine of the class described, the combination with a group of manipulative keys; a detent to lock any one of the keys in depressed position and the remainder in undepressed position; and a shaft to release the machine for operation; of a restraining member journaled on the release shaft; means fast on the shaft to insure the rotation of the restraining member with the release shaft in one direction; means to restore the restraining member to its normal position; a dog normally engaged with the restraining member to prevent rotation of the release shaft in one direction; means operated by a key, when depressed, to disengage the dog from the restraining member to free the shaft; means on the restraining member rendered effective by adjustment of the member in one direction, to hold the detent against releasing movement; and releasable means to automatically latch the restraining member in such adjusted position.

9. In a machine of the class described, the combination with a group of manipulative keys; a normally latched shaft adapted to be rocked to release the machine; and a detent associated with the keys; of an arm on the shaft adapted to be rocked with the shaft in one direction, to lock the detent against releasing movement; means to latch the arm in its normal position; another means to latch the arm in position to lock the detent; means operated by depression of one of the keys to disable the first-mentioned latching means; and manipulatively-controlled means to disable the second-mentioned latching means.

10. In a machine of the class described; the combination with a group of keys; a shaft adapted to be rocked to release the machine for operation; and a releasable detent adapted to lock the keys against release or depression; of an arm on the shaft adapted to be adjusted by the shaft to lock the detent against release; means to latch the arm in its adjusted position during certain operations of the machine; and means to maintain the latching means in its normal unlatching position during the other operations of the machine.

11. In a machine of the class described; the combination with a group of keys; a shaft adapted to be rocked to release the machine for operation; and a detent to lock the keys against release and depression; of an arm loose on the shaft and adjusted by the shaft to lock the detent in effective position; means to latch the arm in its adjusted position; manipulatively-controlled means to disable the latching means; and means to restore the arm to normal position.

12. In a machine of the class described, the combination with a plurality of keys; a normally releasable detent associated therewith; a rotatable shaft; and means to turn the shaft in opposite directions; of a locking member journaled on the shaft; means to enforce adjustment of the locking member by the shaft when turned in one direction, to cause the locking member to co-act with the detent to hold the keys in the positions occupied at the beginning of the rotation of the shaft; means to latch the locking member where adjusted; means to release the latch; and means to restore the locking member to normal position upon the release of the latching means.

13. In a machine of the class described, the combination with a plurality of keys; a releasable detent associated therewith; a rotatable shaft; and means to turn the shaft in opposite directions; of a locking member journaled on the shaft; means to enforce adjustment of the locking member by the shaft when turned in one direction, to cause the locking member to co-act with the detent to hold the keys in the positions occupied at the beginning of the rotation of the shaft; means to latch the locking member where adjusted; means to release the latch; means to restore the locking member to normal position upon the release of the latching means; and means operable upon the latch-releasing means to cause it to retain the latching means in ineffective position until the restoration of the locking member to its normal position.

14. In a machine of the class described, the combination with a plurality of keys; a releasable detent associated therewith; a rotatable shaft; and means to rock the shaft in opposite directions; of normally effective means to prevent rotation of the shaft in one direction, including an element fixed on the shaft; a loosely mounted arm having a flexible connection with the rotatable shaft and positively operated by the fixed element in one direction; and a key-controlled locking member normally engaging the loosely mounted member; and means on the loosely-mounted member to lock the releasable detent when the loosely mounted member is positively operated by the fixed element.

15. In a machine of the class described; the combination with a plurality of keys; a releasable detent associated therewith; a rotatable shaft; and means to turn the shaft alternately in opposite directions; of a pivoted locking member for the releasable detent, normally in ineffective position; the shaft being rotatable relatively to the locking member in one direction; means on the shaft to enforce the adjustment of the locking member to effective position when the shaft is turned in the opposite direction; means to temporarily retain the locking member in its effective position after the shaft has returned to its home position; means to release the retaining means; and means to restore the locking member to ineffective position relatively to the detent.

16. In a machine of the class described; the combination with a plurality of keys; a releasable detent associated therewith; a rotatable shaft; and means to turn the shaft alternately in opposite directions; of a pivoted locking member for the releasable detent, normally in ineffective position, the shaft being rotatable relatively to the locking member in one direction; means on the shaft to enforce the adjustment of the locking member to effective position when the shaft is turned in the opposite direction; a latch to retain the locking member in its effective position; means to restore the locking member to its ineffective position; manipulatively-controlled means to release the latch and free the locking member to the action of its restoring means; and means to delay the action of the latch-releasing means.

17. In a machine of the class described, the combinaiton with a set of keys; a releasable detent associated therewith; a rotatable shaft; and means to rock the shaft in opposite directions; of means to lock the detent against release, including a loosely mounted restraining member; a member fixed on the rotatable shaft and adapted to advance the restraining member to effective position relatively to the detent, as the shaft turns in one direction; means to restore the restraining means to normal position; means to latch the restraining means in effective position; and selective means to determine the operativeness of the latch.

18. In a machine of the class described, the combination with a set of keys; a releasable detent associated therewith; a rotatable shaft; and means to rock the shaft in opposite directions; of means to lock the detent against release, including a loosely mounted restraining member; a member fixed on the rotatable shaft and adapted to advance the restraining member to effective position relatively to the detent, as the shaft turns in one direction; means to restore the restraining means to normal position; means to latch the restraining means in effective position; selective means to determine the operativeness of the latch; and means under manipulative control to release the latch to enable the restraining member to restore to home position irrespective of the selective means.

19. In a machine of the class described, the combination with a set of keys; a releasable detent associated therewith; a rotatable shaft; and means to rock the shaft in opposite directions; of means to lock the detent against release, including a loosely mounted restraining member; a member fixed on the rotatable shaft and adapted to advance the restraining member to effective position relatively to the detent, as the shaft turns in one direction; means to restore the restraining means to normal position; means to latch the restraining means in effective position; selective means to determine the operativeness of the latch; means under manipulative control, to release the latch and enable the restraining member to restore to home position; and means to delay the operation of the last-named means.

20. In a machine of the class described, the combination of a group of keys; a group of control devices; a shaft adapted to be rocked to release the machine for operation; a detent to lock the keys against release and depression; a member loose on the shaft and adjustable thereby to lock the detent in effective position; means to latch said member in its adjusted position; and means controlled by said control devices to determine whether the latch means shall be effective for one operation only or for a plurality of successive operations.

In testimony whereof I affix my signature.

SAMUEL BRAND.